(12) United States Patent
Malik

(10) Patent No.: US 12,545,167 B1
(45) Date of Patent: Feb. 10, 2026

(54) HYDRAULIC SINGLE AXLE TOW DOLLY

(71) Applicant: Urfan Malik, Splendora, TX (US)

(72) Inventor: Urfan Malik, Splendora, TX (US)

( * ) Notice: Subject to any disclaimer, the term of this patent is extended or adjusted under 35 U.S.C. 154(b) by 341 days.

(21) Appl. No.: 18/137,636

(22) Filed: Apr. 21, 2023

Related U.S. Application Data

(60) Provisional application No. 63/338,170, filed on May 4, 2022.

(51) Int. Cl.
*B60P 1/02* (2006.01)
*B60P 3/077* (2006.01)

(52) U.S. Cl.
CPC .............. *B60P 1/025* (2013.01); *B60P 1/027* (2013.01); *B60P 3/077* (2013.01)

(58) Field of Classification Search
CPC ............ B60P 1/025; B60P 1/027; B60P 3/077
USPC ........................................................ 414/364
See application file for complete search history.

(56) References Cited

U.S. PATENT DOCUMENTS

| | | | | |
|---|---|---|---|---|
| 3,865,405 A * | 2/1975 | Mitchell | ................. | B60D 1/075 280/476.1 |
| 3,979,137 A * | 9/1976 | Lipscomb, Jr. | ........... | B60P 3/07 280/402 |
| 3,997,186 A * | 12/1976 | Pottorff | ..................... | B60R 9/10 280/402 |
| 5,727,920 A * | 3/1998 | Hull | ........................ | B60P 3/127 280/43.19 |
| 5,732,960 A * | 3/1998 | Elam | ..................... | B60B 29/002 254/113 |
| 6,685,211 B2 * | 2/2004 | Iles | ......................... | B60D 1/665 280/476.1 |
| 7,100,489 B1 * | 9/2006 | Kendall | .................. | F41H 11/30 172/450 |
| 7,845,670 B2 * | 12/2010 | Oberg | ...................... | B60D 1/66 280/47.24 |
| 9,085,322 B2 * | 7/2015 | Olsen | ..................... | B62D 13/04 |
| 10,160,468 B1 * | 12/2018 | Hurd | ..................... | B62B 5/0093 |
| 2006/0001230 A1 | 1/2006 | Finch | | |
| 2006/0045683 A1 * | 3/2006 | Huiming | .............. | B60B 29/002 414/426 |

(Continued)

FOREIGN PATENT DOCUMENTS

| | | | | |
|---|---|---|---|---|
| CA | 2591649 A1 * | 6/2008 | ............ | A01B 49/02 |
| CN | 207149987 U * | 3/2018 | | |

(Continued)

*Primary Examiner* — Terrell H Matthews
(74) *Attorney, Agent, or Firm* — John Rizvi; John Rizvi, P.A.—The Patent Professor ®

(57) ABSTRACT

A single axle tow dolly is provided herein. The tow dolly contains a frame, a pair of wheels coupled to the frame and a set of hydraulic cylinders which are connected to the wheels. Each of the hydraulic cylinders can be connected to one of the wheels such that its operation functions to lower the frame to a ground level position and subsequently to raise the frame to a position above the ground for easy pulling. The hydraulic cylinders can operate to lower a platform of the dolly to a position which can more readily load a vehicle or cargo thereon. Thereafter, the hydraulic cylinders can raise the platform to an elevated level plane which is above the ground. The dolly can also contain wheel locks for a vehicle to be secured in place for towing. Further the dolly can have any of a pivoting tow section and a ramp for loading vehicles such as motorcycles.

16 Claims, 9 Drawing Sheets

(56) References Cited

U.S. PATENT DOCUMENTS

| | | | | |
|---|---|---|---|---|
| 2008/0069674 A1* | 3/2008 | Hassell | ................ | B62B 5/0083 |
| | | | | 414/428 |
| 2008/0135319 A1* | 6/2008 | Lynn | ..................... | B62K 15/00 |
| | | | | 280/638 |

FOREIGN PATENT DOCUMENTS

| | | | | | |
|---|---|---|---|---|---|
| CN | 215751721 U | * | 2/2022 | | |
| DE | 4132646 A1 | * | 4/1993 | ............... | B62B 9/26 |
| NO | 164586 B | * | 7/1990 | ............... | B60P 1/64 |

* cited by examiner

HYDRAULIC SINGLE AXLE TOW DOLLY

CROSS-REFERENCE TO RELATED APPLICATIONS

This application claims the benefit of U.S. Provisional Patent Application Ser. No. 63/338,170, filed on May 4, 2022, which is incorporated by reference herein in its entirety.

FIELD OF THE INVENTION

The present invention relates generally to the field of vehicles. More particularly, the present invention relates generally to vehicles for towing, be it other vehicles or cargo.

BACKGROUND OF THE INVENTION

With the widespread use of vehicles, there are numerous occasions when such vehicles need to be towed. Be it for repair, or merely to relocate the vehicle to another distant location, it is often necessary to place the vehicle on a trailer and transport it accordingly. Various types of trailers exist for this purpose. One example is a flatbed trailer which supports all four wheels of the vehicle. Another example is a towing trailer which pulls the vehicle by supporting the front axle in the air and permitting the rear axle to rotate on the ground behind the trailer as it is pulled by a vehicle thereafter.

Each of these types of trailers have its shortcomings. Flat bed trailers require that the vehicle be driven up or pulled up a significantly angled ramp. This can be difficult or impossible to accomplish if the vehicle cannot be driven, such as when a vehicle is being repossessed and the keys to the vehicle are not available. Alternatively, if pulled up the ramp, the wheels can entail some significant wear when being dragged up such an incline. In addition, flat bed trailers are large and unwieldy and require significant storage space when not in use.

In contrast, the use of a towing trailer does not require that the vehicle be driven onto the trailer, but the use of a towing trailer does impose wear and tear on the rear axle and wheels of the vehicle and requires that an operator attach supporting beams and/or chains to the front wheels to properly tow the vehicle. While such trailers are smaller in size, they usually also instill a great deal of wear on the rear portion of the vehicle pulling it in the inclined format.

Other types of smaller vehicles, such as motorcycles, are very unstable and unwieldy to begin with, and as such, they are difficult to place onto a trailer. They usually require the use of trailers that are very close to the ground. These trailers in turn cannot handle long drives since the wheels are smaller, due to being close to the ground. These wheels cannot handle high speeds and obstacles such as potholes and long drives through difficult terrain.

One attempt to address these issues is the use of a standard dolly in an attempt to load the vehicle onto the trailer. First, such requires a separate piece of equipment which renders the process more costly. Second, while some have used winches and come alongs to load vehicles onto a trailer, such has had its own challenges. Such can break under the heavy weight of a vehicle in the loading process. This has the capacity to cause tremendous damage to the vehicle and the winch or come along as well as the clear risk of serious injury to those loading the vehicle.

Further, along with the vehicles to be towed, often other cargo from the vehicle or the tow vehicle must be towed along therewith. For example, the towing vehicle may have a compartment for tools that may be required so as to attempt to repair the vehicle prior to initiating a tow. Alternatively, the owner may have personal effects such as a motorcycle helmet and items they are moving with the vehicle, that may need to be separately accessed from the vehicle. However, most tow trucks do not contain any means for separately storing these items other than in the back of the tow truck or in the passenger compartment thereof. Further, it can be difficult to load such items onto the elevated height of a flatbed trailer or onto an inclined towing trailer.

In addition to the aforementioned issues, often a trailer will require a trailer jack to lift the trailer to a height that allows the trailer to be hitched or unhitched to and from the towing vehicle. The trailer jack is also often necessary to level the trailer during its pulling as well as when it is stored. The use of a trailer jack can be tedious and time consuming and does little to alleviate the noted height loading issues.

Accordingly, there remains a need for a solution to at least one of the aforementioned problems. For instance, there is an established need for a means of carrying vehicles and/or cargo, especially small vehicles, wherein it is easy to load the vehicles, and wherein the vehicles and cargo can be effectively carried long distances safely on larger wheels.

SUMMARY OF THE INVENTION

The present invention can be directed to a single axle tow dolly, hereinafter "tow dolly". The tow dolly contains a frame, a pair of wheels coupled to the frame, and a set of hydraulic cylinders which are connected to the wheels. Each of the hydraulic cylinders can be connected to one of the wheels such that its operation functions to both lower the frame to a completely flush ground level position, and subsequently, to raise the frame to an elevated position above the ground. The hydraulic cylinders can lower a dolly platform to a position which can more readily load a vehicle and/or cargo thereon. Thereafter, the hydraulic cylinders can raise the platform to an elevated level plane which is above the ground. The elevation can raise the front wheels of a vehicle off the ground to a minimal degree so that it can be towed effectively by its rear axle. The dolly can also contain wheel locks for a vehicle to be secured in place for towing. Further the dolly can have any of a ramp(s) for loading vehicles, such as motorcycles, motorcycle wheel holding brackets, and a pivoting tow section for attachment to a tow hitch on a vehicle for towing the tow dolly.

The term "about" as used herein can entail a variance of 10% greater or lower than the value recited.

The term "substantially" as used herein is understood to be a variance of greater than or less than 10% of the range or range endpoints noted and applies to all uses of the term "substantially" unless stated otherwise.

The term "comprising" as used herein also encompasses the terms "consisting essentially of" and "consisting of".

The values of any endpoint(s) of any range(s) recited herein can be used to create different ranges or different endpoints of ranges to those described herein. The endpoints in any of the ranges described herein can also include any integer value in the recited range even if not expressly described. Thus, for example, a range of from 1.0 to 10 can include as alternate range endpoints any integer between 1 and 10, such as, the non-limiting integer examples of 2, 3, 4, 5, 6, 7, 8 and 9.

In a first implementation of the invention there can be provided a single axle tow dolly comprising:
a frame;
a pair of wheels coupled to the frame; and,
a set of hydraulic cylinders coupled to the pair of wheels, wherein the dolly is configured such that the frame can be lowered to and raised from a ground position with the hydraulic cylinders.

In one aspect of the invention, the frame can be a tow dolly frame as is known to those skilled in the art. In one embodiment, it can be made of materials such as a channel frame, I-beam frame, or a tubing frame. In another embodiment, the frame can be such that it has any one of a single tongue, A-frame tongue, and a composite tongue.

In another aspect of the invention, the frame can be made of any suitable metal material, such as aluminum, aluminum alloys, steel, stainless steel, galvanized steel, and the like.

In another aspect of the invention, the frame can also be a ladder type construction with a perimeter having cross beams laid across the width of the perimeter (such as steps on a ladder) with platforms laid over the cross beams, and/or within a lip on the perimeter of the frame or within on lips connected to areas defined by the cross beams which hold the platform thereon.

In yet another aspect of the invention, the frame can be any suitable shape, although a rectangular or square shape are generally used, more preferably rectangular, with the width of the dolly/trailer being longer than the length of the dolly, or vice versa.

Preferably, the dolly can be from about 80 inches to about 120 inches wide, more preferably from about 90 to about 110 inches wide and most preferably from about 95 inches to about 105 inches wide, with 102 inches wide being the most preferred embodiment. The dolly can be from about 50 inches to about 90 inches long, preferably from about 60 to about 80 inches long and most preferably from about 65 to about 75 inches long, with 72 inches long being the most preferred embodiment.

In yet even another aspect of the invention, frame can have a front platform area which is rectangular with the front of the dolly defining the length of the rectangular shape, and with length of the front platform area along the sides of the dolly being defined by the width of the rectangular shape, and the reverse configuration is also envisioned herein. In one embodiment, the front platform area can contain angled sections transitioning from the side and the front of the frame, e.g., at an angle of from about 30 degrees to about 50 degrees, preferably about 45 degrees.

In another aspect of the invention, the front platform area of the frame can also contain one or more, preferably two, motorcycle wheel holding brackets along a front centered portion of the platform of the front platform area. The front platform area can also contain a gate emanating perpendicularly and vertically from the front width perimeter portion of the front platform area which can be configured to retain vehicles, e.g., cars and motorcycles, or cargo on the front platform area, and prevent the same from sliding off of the front platform area in the event of a short stop with the vehicle towing the tow dolly described herein. The gate can have a height of from about 18 inches up to about 4 feet.

The frame may also contain a rear wheel area directly behind the front platform area, which contains longitudinal members which continue to define the sides of the dolly frame and which run parallel in terms of their length substantially to the diameter of the wheels, wherein substantially is understood to mean that the diameter of the wheels of the rear wheel is from 80% to about 99% of the length of the length of the longitudinal members which run parallel to the diameter of the wheels. In one embodiment, the longitudinal members run along the interior diameter of the wheels of the frame, i.e., the longitudinal members are indented from the width of the sides of the front platform area, such that the sides of the wheels, which are located in such an indentation, are substantially flush along the side of the frame with sides of the front platform area, and wherein the expression substantially flush means that the width of the frame from the outside of one tire across to the outside of the other tire is about 80% to about 99% of the width of the front platform area, preferably about 95% to about 99 of the width of the front platform area.

In yet one other aspect of the invention, the rear wheel area can comprise two wheel lock sections which can each be perpendicular to the end of the longitudinal members of the rear wheel area and run longitudinally in a direction towards an interior of the frame from the end of the longitudinal members. Preferably, the wheel lock sections are from about 24 inches up to about 48 inches, preferably from about 30 inches up to about 40 inches each.

In yet one other aspect of the invention, the rear wheel area can comprise a rear width closing beam which can be coupled width wise across the frame to each of the wheel lock sections on either opposing side of the frame to serve as a support for different options for the frame. In one non-limiting embodiment, one of such options is to employ a ramp for loading vehicles onto the front platform area, such as motorcycle ramps, which can be from 12 inches up to about 24 inches in width and can be from about 4 to about 8 feet in length. Such a ramp can be supported underneath by the rear width closing beam and can act as a bridge from the ground to the elevation of the thickness height of the frame, e.g., from about 3 inches up to about 8 inches above the ground when the dolly is fully lowered.

In another non-limiting embodiment, another option for the rear width closing beam is that an additional platform material can be inset into the rear section of the frame by resting on a lip or the beam itself as described herein above, and such rear section of the frame can employ the longitudinal members, the wheel lock sections and the rear width closing beam as a perimeter of the rear section to support such an additional platform material. Such a second option can be employed when a cargo carrier option is desired.

In yet even one other aspect of the invention, the frame of the tow dolly can contain a tow connector portion which can be coupled to the front width of the frame through a trapezoid framed area. The tow connector portion can have a longitudinal length of from about 4 feet to about 8 feet, preferably about 6 feet, and which can be a square beam having dimensions of from about 2 inches square to about 6 inches square. The tow connector portion can comprise a series of longitudinal segments which are angled at various angles along its length and can be constructed for proper connection to a tow hitch or fifth wheel of a towing vehicle, such as a towing car, van, motorcycle, or truck as would be understood by someone of ordinary skill in the art.

In another aspect of the invention, the tow connector portion can be connected to a front perimeter of the frame, i.e., the front platform area, by the trapezoid framed area which is smaller in width than the width of the front of the dolly.

In yet another aspect of the invention, the tow connector portion can contain a Y-shaped set of beams at the end of the tow connector portion closest to the tow dolly, which is used to support the trapezoid framed area and the housing thereon.

In yet still another aspect of the invention, the trapezoid framed area can be attached to the front platform area of the frame by attaching passing a pin through both, a hole at the tip end of each top of the Y shaped beams and one of a set of two brackets which are attached to a front side of the front platform area of the tow dolly frame. The use of the brackets with a hole in them and pin through the upper tips of the Y shaped beams and the hole in the brackets permits for the tow connector portion to be connected to the front platform area of the frame and angled at different angles when the tow dolly is lowered and raised and permits complete flush placement of the frame of the tow dolly along the ground in the lowered position.

Preferably, the trapezoid framed area is centered along the front perimeter width of the front platform area of the frame (along a front surface of the beam making up the front platform area of the frame) such that the side of the trapezoid framed area connecting to the front platform area of the frame is from about 48 inches up to about 72 inches in length and the side of the trapezoid framed area connecting to the spread between the top tips of the Y-shaped beams is about 24 to about 60 inches in length. The trapezoid framed area of the frame can contain a platform thereon in the same lip support or beam support manner described herein above, which platform can have a housing for containing other items such as tools, personal effects and the like positioned thereon. The housing can preferably have substantially the same height as the gate described herein. The trapezoid frame area can be connected by two or more underlying trapezoidal frame longitudinal members to the front platform area of the frame. Such underlying trapezoidal frame longitudinal members can be from about 6 inches to about 15 inches, preferably from about 8 to about 12 inches in length.

In yet still one other aspect of the invention, the pair of wheels coupled to the frame can be tires of any suitable size amenable to the load being carried on the tow dolly. Preferably, the tires can be 205/75/15 in size. In another embodiment, the wheels may each have their own fender which can have reflectors and/or lights positioned thereon.

In yet still even another aspect of the invention, the set of hydraulic cylinders can comprise two hydraulic cylinders wherein one hydraulic cylinder is coupled to each of the wheels. Any conventional hydraulic cylinders which are suitable for lifting and lowering the tow dolly may be used as would be understood by those of ordinary skill in the art.

In another aspect of the invention, the hydraulic cylinders can be connected to the frame, preferably the rear wheel area of the frame by the use of a thrust assembly mechanism, preferably wherein there can be a thrust assembly mechanism for each wheel. Each of the thrust assembly mechanism(s) can be placed on an upper surface/side of the longitudinal member running parallel to the wheel in the rear wheel area. The thrust assembly mechanism can be made of the same or different metal materials described herein above for the frame.

In yet another aspect of the invention, the thrust assembly mechanism can comprise a vertical plane and a horizontal plane which is perpendicular in orientation to the vertical plane and is centered along the surface of the vertical plane. The vertical plane can be a plane that is parallel to and between a plane of an inside surface of the wheel and a plane encompassing the side of the longitudinal member making up a side of the rear wheel portion of the frame. The thrust assembly can further comprise an axle extending from one longitudinal end of the outside surface of the vertical plane and into the wheel to act as the axle for the rotation of the wheel. The opposing longitudinal end of the thrust assembly can comprise a rotation hole which can contain a rotation pin that passes through the rotation hole and through the rear longitudinal member which is in a plane parallel to the vertical plane of the thrust assembly. The rotation pin can have thereon suitable fasteners such as anti-friction bushings and the like to facilitate the rotation of the thrust assembly around the axis of the rotation pin.

The thrust assembly, when the tow dolly is in the elevated position, can have the horizontal plane lying flush to a top surface of the rear longitudinal member. The horizontal plane of the thrust assembly can have a flange with a hole therethrough emanating from the end of the horizontal plane closest to the axle location on the vertical plane of the thrust assembly. The rear longitudinal member can have an equivalent sized flange emanating in a parallel plane to the flange on the horizontal plane, also with a hole therethrough, which emanates vertically from a top surface of the rear longitudinal member. The two holes of the two flanges are in line when the dolly is in the elevated position and a locking pin can be placed therein to secure the thrust assembly from motion away from the rear longitudinal member during transport. In another embodiment, an actuator can be used to secure the locking pin.

In yet another aspect of the invention, the thrust assembly can also comprise a vertical central flange emanating from the substantial center of the horizontal plane of the thrust assembly which vertical central flange has a hole therein which is in line with a corresponding hole in the vertical plane of the thrust assembly. An anchor of one end of a hydraulic cylinder can be secured between the two corresponding holes by an anchor pin and an opposing anchor end of the hydraulic cylinder can be connected with another pin to two like vertical flanges with corresponding holes found on a portion of the front platform area of the frame. The hydraulic cylinder can lie flush and level with the level of the tow dolly platform when the tow dolly is in the elevated position.

In yet even another aspect of the invention, when the tow dolly is lowered from the elevated position described above to the lowered flush ground level position, the locking pin from the flanges can be removed either manually or with an actuator mechanism, and the thrust assembly is such that it is rotated clockwise forward on the rotation pin in the plane of the vertical plane, and towards the front of the tow dolly at least in part, and thus, moves the axle attached wheel as well by the contraction, i.e. reduction in length of the piston of the hydraulic cylinder. Likewise, in reverse, when the tow dolly is elevated from the ground level flush position to the elevated position, the thrust assembly is laid along the horizontal plane on the top surface of the rear longitudinal member till the locking holes in the flanges align at which time they can be locked with the locking pin.

The actuation of the hydraulic cylinder, can preferably be done through an electric switch connected by wiring to a hydraulic pump mechanism which actuates the hydraulic cylinders, as is known by those of ordinary skill in the art.

In a second implementation of the invention there can be provided herein a method of loading a dolly comprising:
  providing a single axle tow dolly which comprises:
    a frame;
    a pair of wheels coupled to said frame; and,
    a set of hydraulic cylinders coupled to said pair of wheels, wherein the dolly is configured such that the frame can be lowered to and raised from a ground position with the hydraulic cylinders;
  lowering the single axle tow dolly to a ground position;

loading a vehicle or cargo onto the single axle tow dolly; and, raising the single axle tow dolly from the ground position to an elevated position.

In another aspect of the invention, when the vehicle is loaded onto the single axle tow dolly the wheels can be held in place by the wheel lock sections and with the use of conventional chains and straps as is known by those of ordinary skill in the art of towing.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
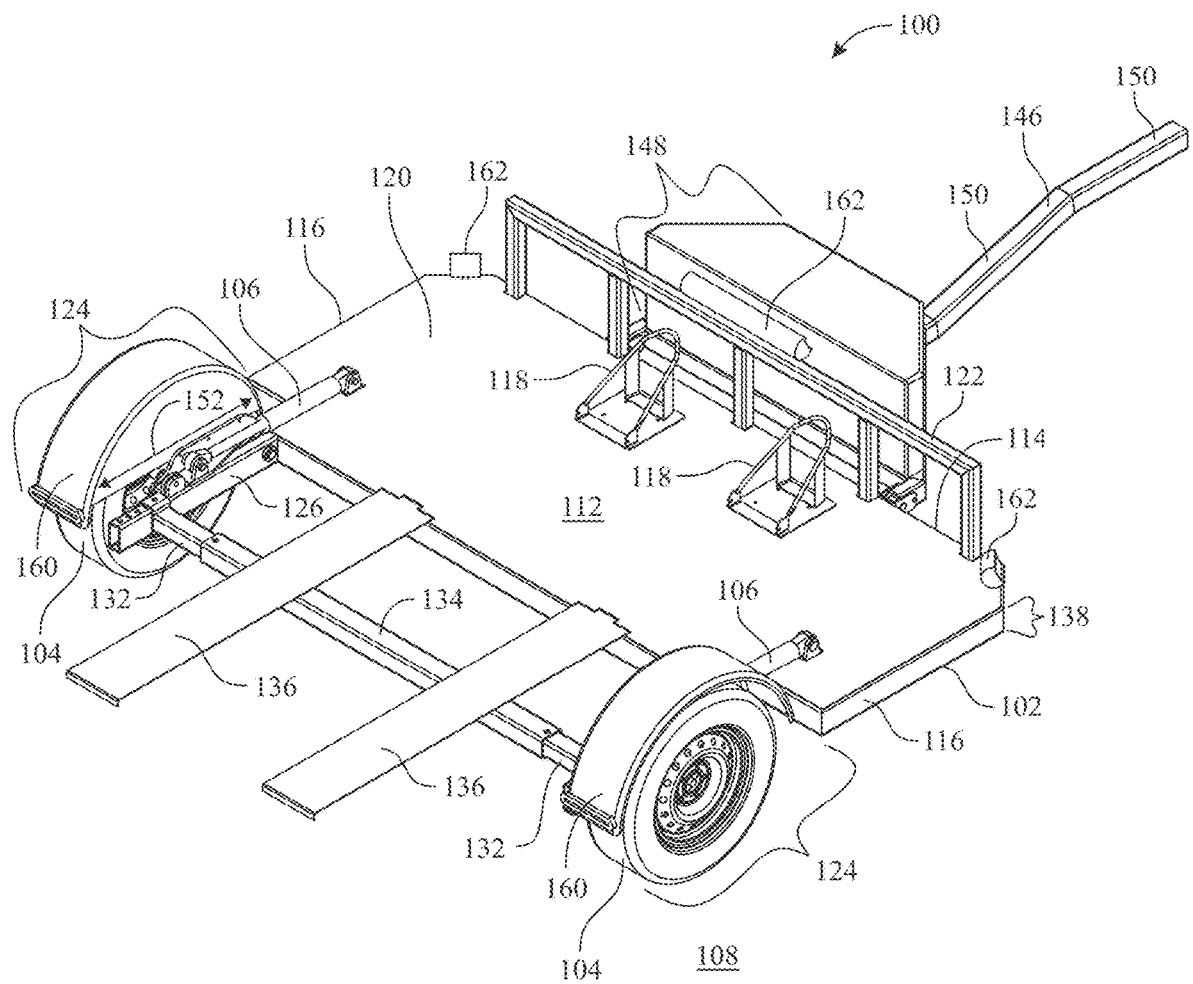
FIG. 1 is a perspective view of the tow dolly of the present invention containing the motorcycle ramps and motorcycle wheel brackets.
Figure 2:
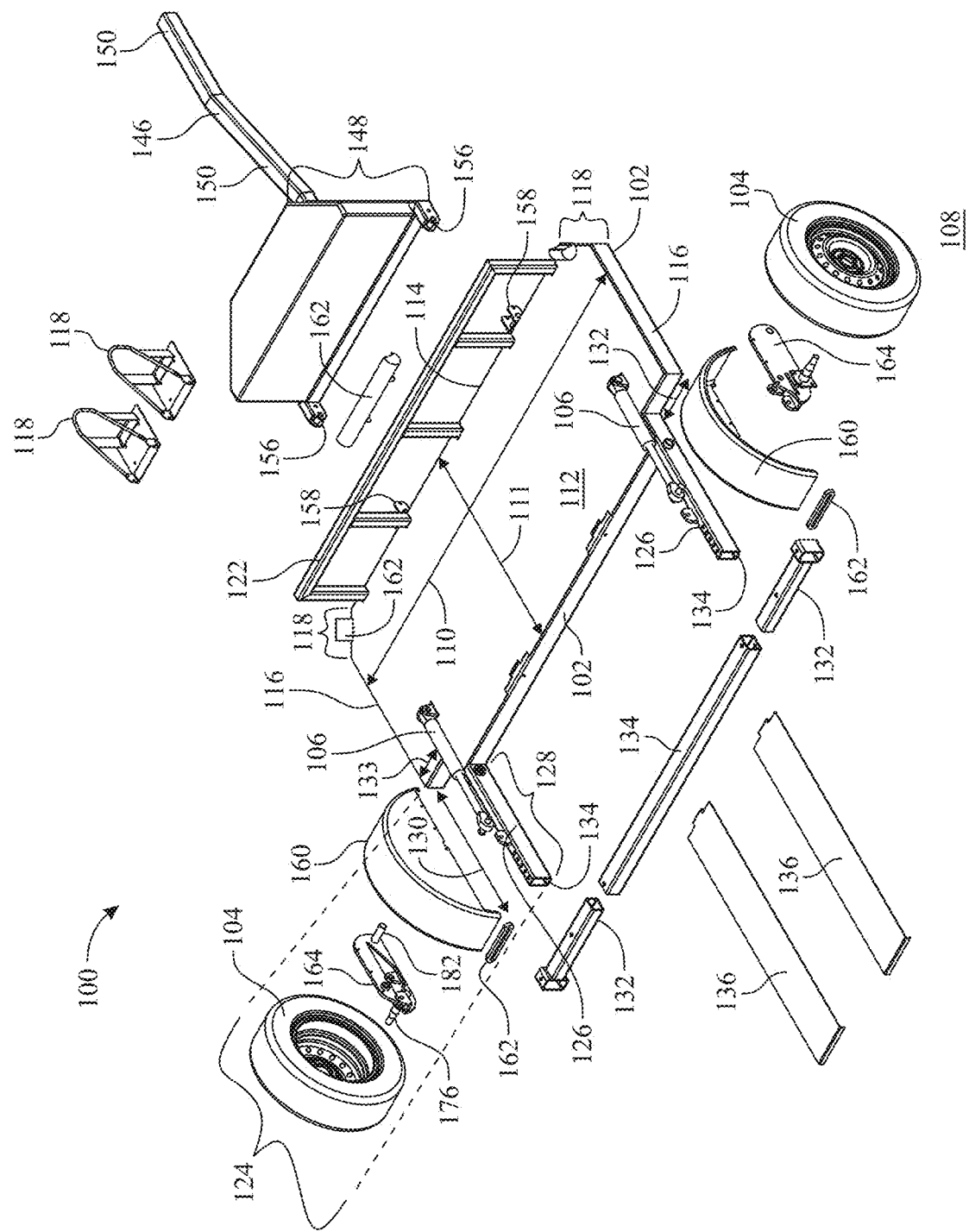
FIG. 2 is an exploded view of the tow dolly of FIG. 1.

Referring initially to FIGS. 1 and 2, there is provided a single axle tow dolly 100, hereinafter tow dolly 100. The tow dolly 100 can comprise a frame 102, a pair of wheels 104 which are coupled to the frame 102, and a set of hydraulic cylinders 106 coupled to the pair of wheels 104. Dolly 100 can be configured such that frame 102 can be lowered to and raised from a ground position 108 with the hydraulic cylinders 106.

Referring more specifically to FIG. 2, frame 102 can in one non-limiting embodiment, be rectangular with the width 110 of the tow dolly 100 being greater than the length 112 of the tow dolly 100. Frame 102 can have a front platform area 112. The front platform area 112 can be rectangular with the front 114 of the dolly 100 frame 102 defining the length 110 of the rectangular shape, and with length 111 of the front platform area 112 along the sides 116 of the dolly 100 frame 102 being defined by the width of the rectangular shape. The front platform area 112 can contain angled sections 118 transitioning from the front 114 and the sides 116 of the frame 102.

Still referring to FIG. 2, the front platform area 112 of the frame 102 can also contain motorcycle wheel holding brackets 118 along a front centered portion of the platform 120 of the front platform area 112. The front platform area 112 can also contain a gate 122 emanating perpendicularly and vertically from the front width perimeter portion (not shown) of the front platform area 112. The frame 102 of the dolly 100 may also contain a rear wheel area 124 directly behind the front platform area 112, which contains longitudinal members 126 which continue to define the sides 116 of the dolly 100 frame 102 and which run parallel in terms of their length 128 substantially to the diameter 130 of the wheels 104. The longitudinal members 126 run along the interior diameter 152 of the wheels 104 coupled to the frame 102. The longitudinal members 126 are indented from the width 110 of the sides 116 of the front platform area 112, such that the sides of the wheels 104, which are located in such an indentation 133, are substantially flush along the side 116 of the front platform area 112 of the frame 102.

Referring to FIGS. 1, 2, 5-8, the rear wheel area 124 can comprise two wheel lock sections 132 which can each be perpendicular to the ends 134 of the longitudinal members 126 of the rear wheel area 124 and run longitudinally in a direction towards an interior of the frame 102 from the end 134 of the longitudinal members 126. The wheel lock sections can be used to secure the front wheels 135 of a vehicle such as a car 137. The rear wheel area 124 can comprise a rear width closing beam 134 which can be coupled widthwise across the frame 102 to each of the wheel lock sections 132 on either opposing side 116 of the frame 102. The rear width closing beam 134 can be a support for a ramp(s) 136 for loading vehicles such as motorcycles 138 onto the front platform area 112. Such ramp(s) 136 can be supported underneath by the rear width closing beam 134 and can act as a bridge from the ground 108 to the elevation of the thickness height 140 of the frame 102.

Figure 9:
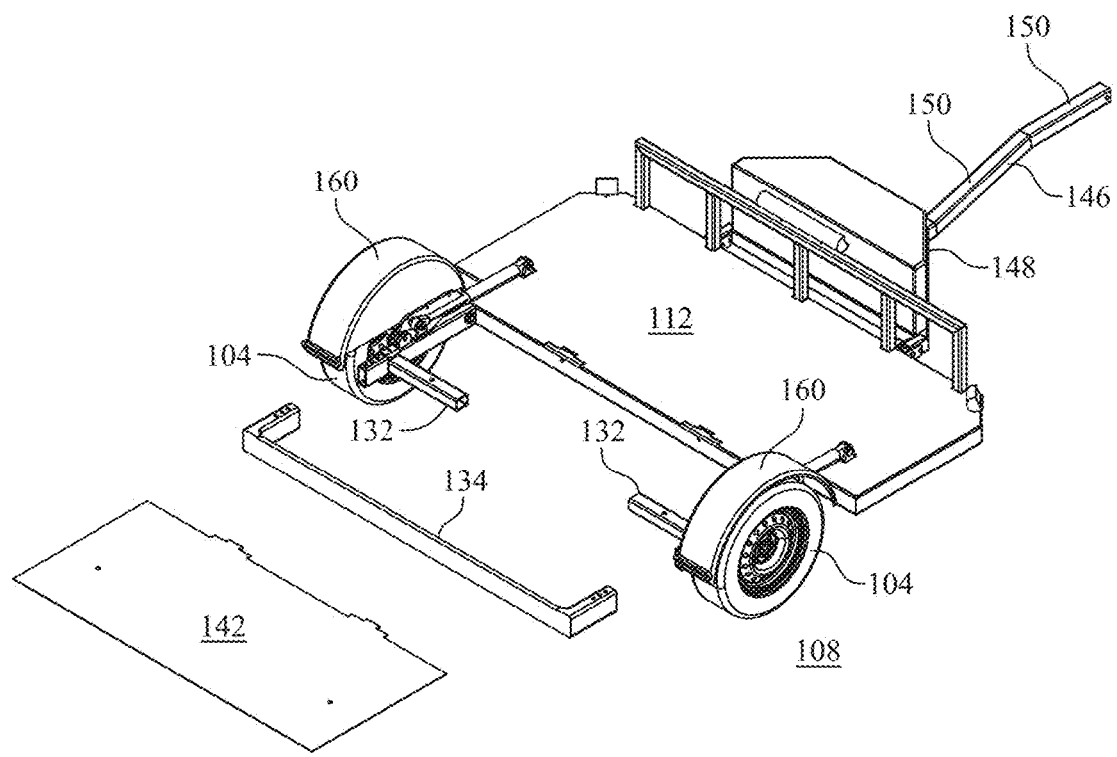
FIG. 9 is a perspective view of the tow dolly of the present invention showing the rear wheel section and an additional platform for placement thereon; and, FIG. 10 is a view of the tow dolly of FIG. 9 having the additional platform in place and loaded with cargo.
Figure 10:
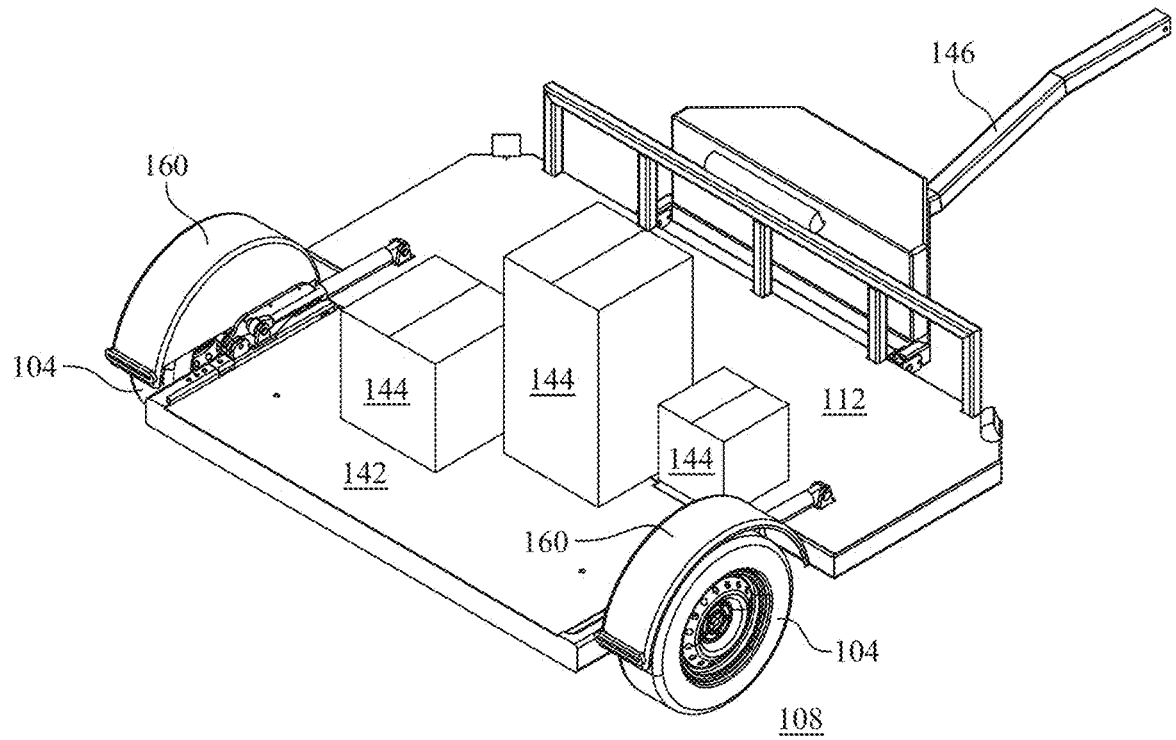

Referring now to FIGS. 9 and 10, the rear width closing beam 134 can have an additional platform material 142 inset into the rear section 124 of the frame 102 by resting on a lip (not shown) or the beam 134 itself, and such rear section 124 of the frame 102 can employ the longitudinal members 126 the wheel lock sections 132 and the rear width closing beam 134 as a perimeter of the rear section 124 to support such an additional platform material 142 which can be used to load cargo 144.

Referring now to FIGS. 1, 2 and 5-10, the frame 102 of the tow dolly 100 can contain a tow connector portion 146 which can be coupled to the front width 138 of the frame 102 through a trapezoid framed area 148. The tow connector portion 146 can comprise a series of longitudinal segments 150. The tow connector portion 146 can be connected to a front perimeter 114 of the frame 102, i.e., the front platform area 112, by the trapezoid framed area 148.

Referring now more specifically to FIG. 2, the trapezoid framed area 148 can comprise a Y-shaped set of beams, (not shown) which is used to support the trapezoid framed area 148 and the housing thereon. The trapezoid framed area 148 can be attached to the front platform area 112 of the frame 102 by a pin (not shown) through a hole at the tip end 156 of the Y shaped beams and two brackets 158 which are attached to a front side 114 of the front platform area 112 of the tow dolly 100 frame 102.

Referring to FIGS. 1-4, the wheels 104 can each have their own fender 160 which can have reflectors and/or lights 162.

Still referring to FIGS. 1-4 the hydraulic cylinders 106 can comprise two hydraulic cylinders 106 wherein each hydraulic cylinder 106 is coupled to one of the wheels 104. The hydraulic cylinders 106 can be connected to frame 102, preferably the rear wheel area 124 of the frame 102 by the use of a thrust assembly mechanism 164, which can be placed on an upper surface/side 166 of the longitudinal member 126.

Figure 3:
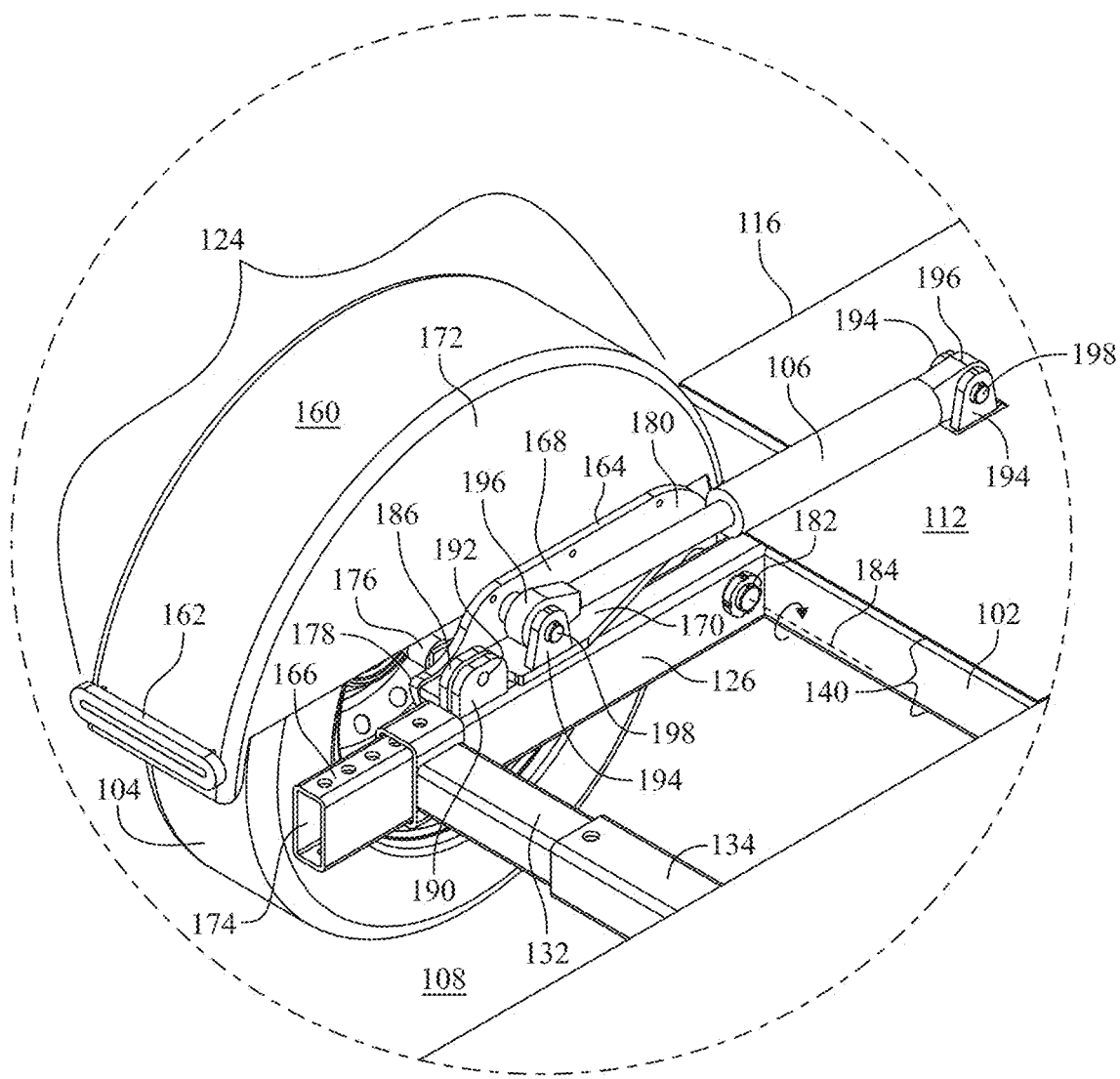
FIG. 3 is a close up view of the left rear wheel and the thrust assembly mechanism when the tow dolly is in the elevated position.
Figure 4:
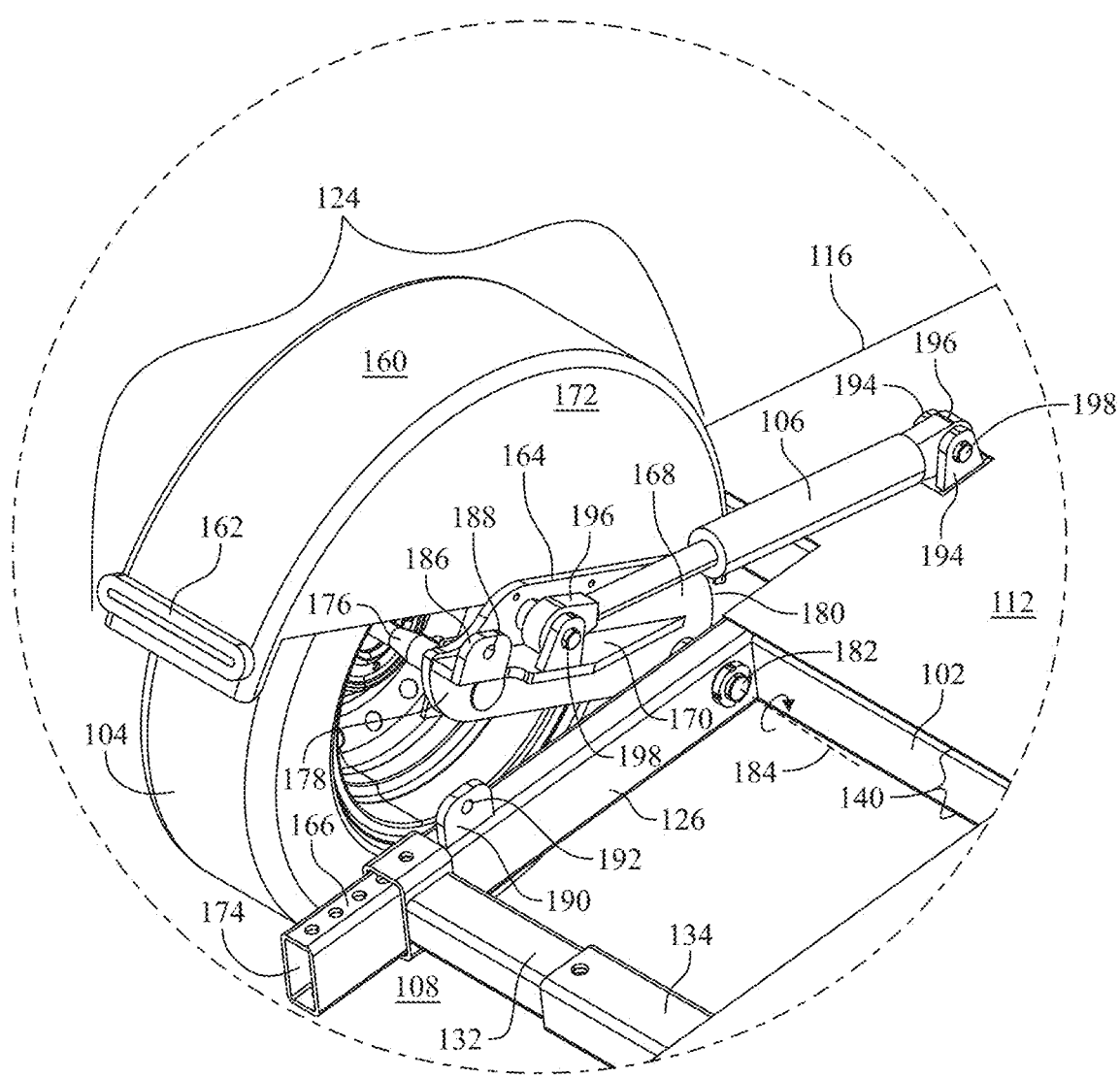
FIG. 4 is a close up view of the left rear wheel and the thrust assembly mechanism when the tow dolly is in the lowered position.
Figure 5:
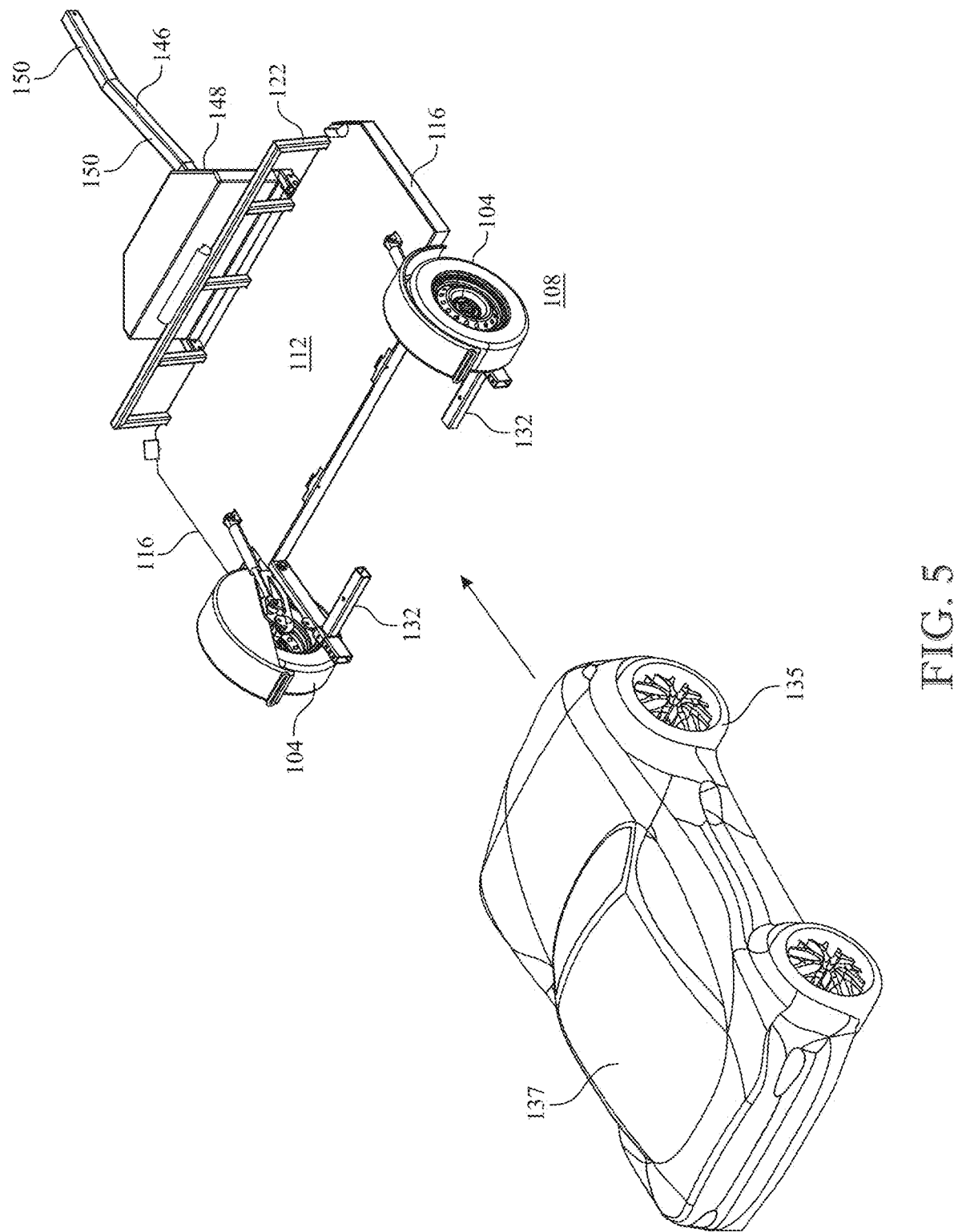
FIG. 5 is a perspective view of the tow dolly of FIG. 4 with a car positioned to be loaded thereon.
Figure 6:
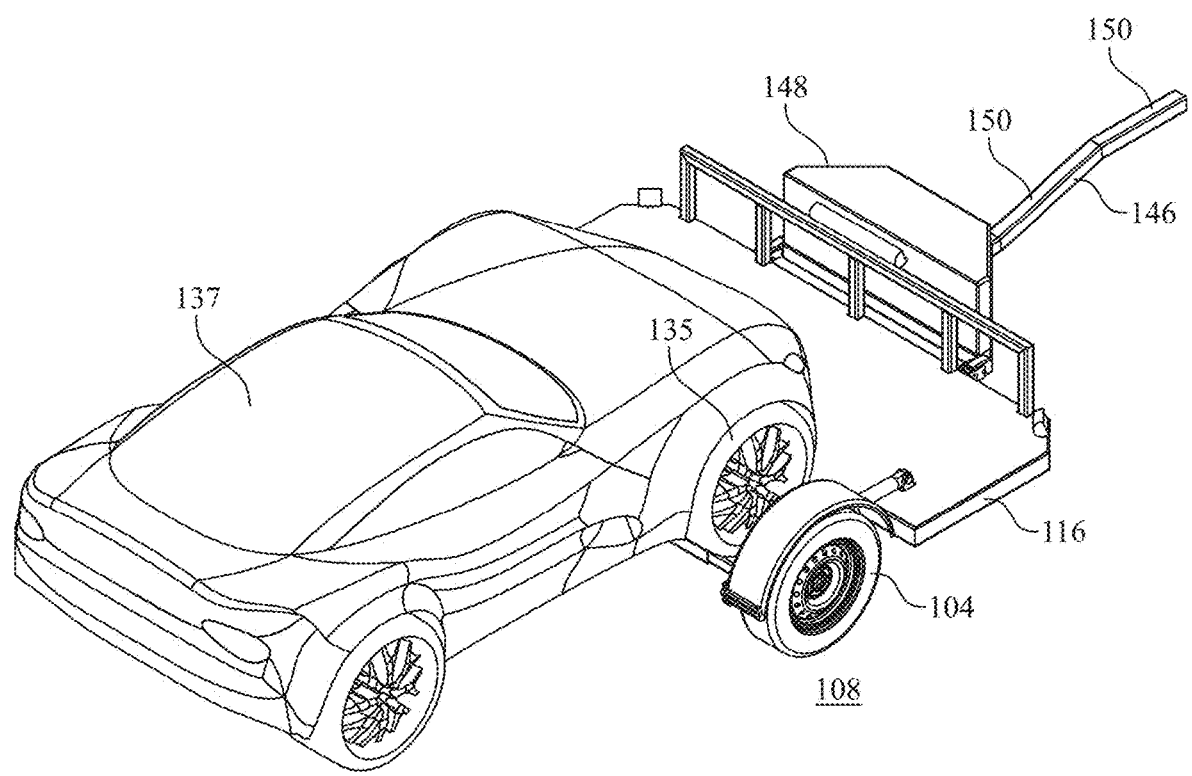
FIG. 6 is a perspective view of the tow dolly of FIG. 4 with a car loaded thereon.
Figure 7:
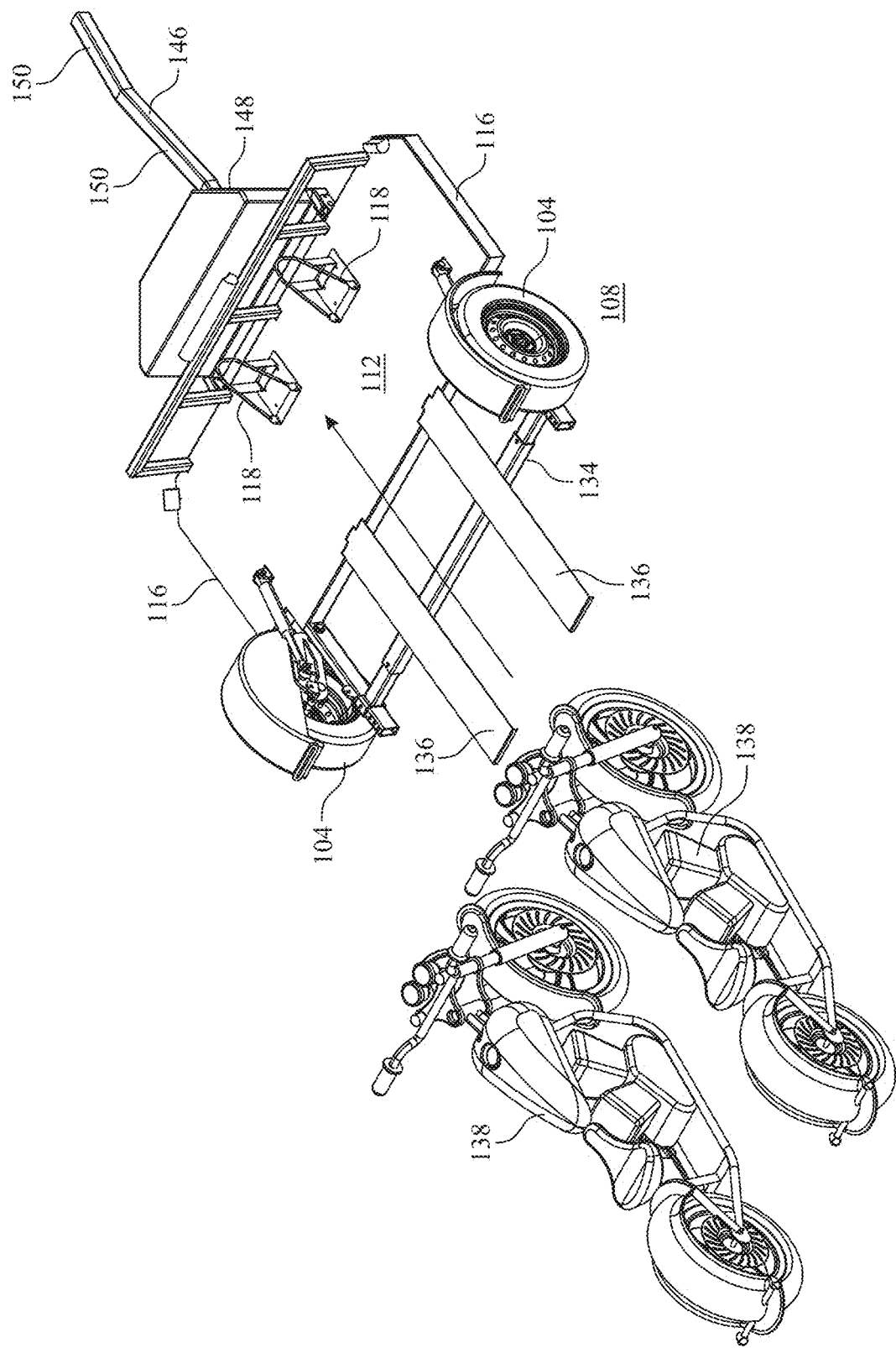
FIG. 7 is a perspective view of the tow dolly of FIG. 1 in the lowered position with two motorcycles positioned to be loaded thereon.
Figure 8:
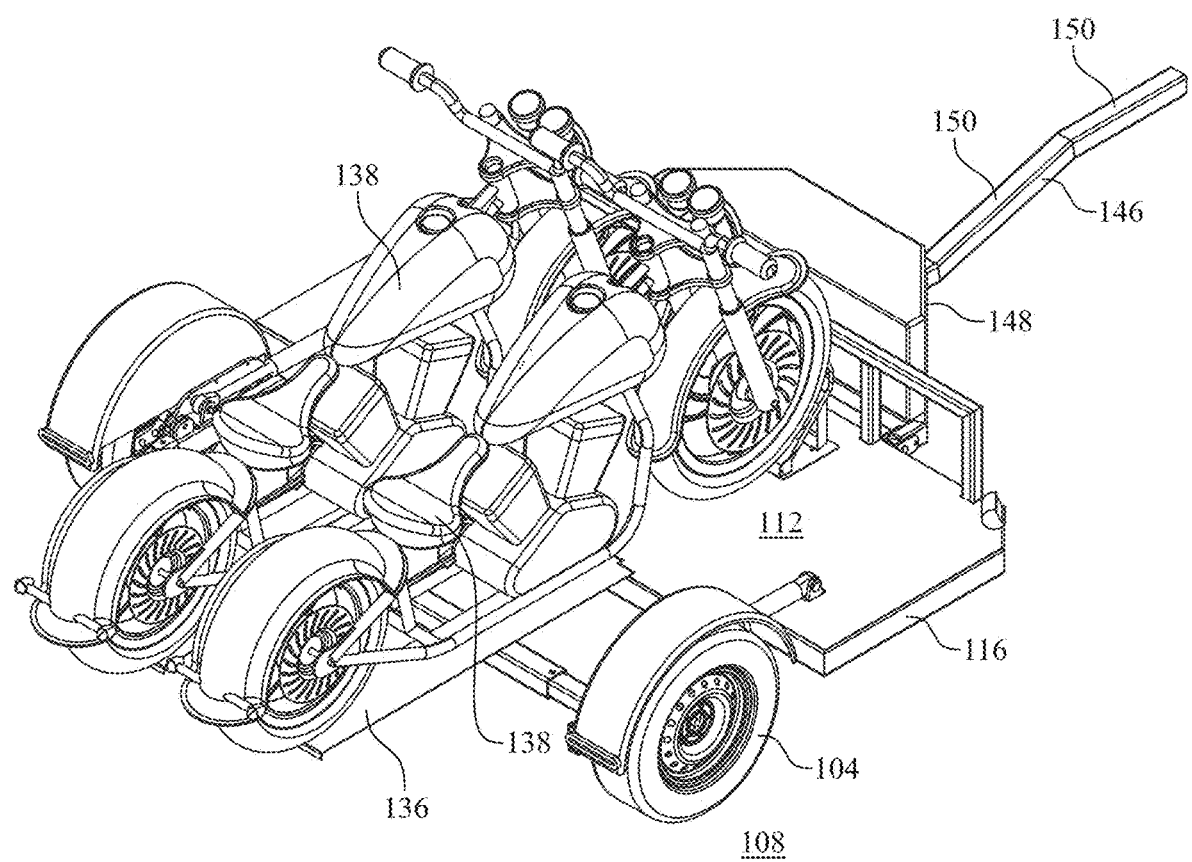
FIG. 8 is a perspective view of the tow dolly of FIG. 7 with the two motorcycles loaded thereon.

Referring more specifically to FIGS. 3 and 4, the thrust assembly mechanism 164 can comprise a vertical plane member 168 and a horizontal plane member 170. The vertical plane member 168 can be a plane that is parallel to and between a plane of an inside surface 172 of the wheel 104 and a plane encompassing the side 174 of the longitudinal member 126. The thrust assembly mechanism 164 can further comprise an axle 176 extending from one longitudinal end 178 of the outside surface (not shown) of the vertical plane 168 and into the wheel 104. The opposing longitudinal end 180 of the thrust assembly mechanism 164 can comprise a rotation hole (not shown) which can contain a rotation pin 182 that passes through the rotation hole and through the longitudinal member 126. The rotation pin 182 can have an axis of rotation 184 which can facilitate the rotation of the thrust assembly mechanism 164.

Still referring to FIGS. 3 and 4, the horizontal plane 170 of the thrust assembly mechanism 164 can have a flange 186 with a hole 188 therethrough. The longitudinal member 126 can have an equivalent sized flange 190 also with a hole 192 therethrough, which emanates vertically from a top surface 166 of the longitudinal member 126. The two holes 188/192 of the two flanges 186/190 are in line when the dolly 100 is in the elevated position and a locking pin (not shown) can be placed through the holes 188/192 to secure the thrust assembly mechanism 164 from motion away from the longitudinal member 126 during transport.

Further referring to FIGS. 3 and 4, the thrust assembly mechanism 164 can also comprise a vertical central flange 194 emanating from the substantial center of the horizontal plane 170, which vertical central flange 194 has a hole (not shown) therein which is in line with a corresponding hole (not shown) in the vertical plane 168 of the thrust assembly mechanism 164. An anchor 196 of one end of a hydraulic cylinder 106 can be secured between the two corresponding holes by an anchor pin 198 and an opposing anchor end 196 of the hydraulic cylinder 106 can be connected with another anchor pin 198 to two like vertical flanges 194 with corresponding holes found on a portion of the front platform area 112 of the frame 102.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A single axle tow dolly comprising:
a frame;
a pair of wheels coupled to the frame; and,
a set of hydraulic cylinders coupled to the pair of wheels, wherein the dolly is configured such that the frame can be lowered to and raised from a ground position with the hydraulic cylinders and wherein the hydraulic cylinders can be connected to a rear wheel area of the frame by a thrust assembly mechanism, and wherein the thrust assembly mechanism comprises a vertical plane, and a horizontal plane which is perpendicular in orientation to the vertical plane, and is centered along a surface of the vertical plane and wherein the thrust assembly further comprises an axle extending from one longitudinal end of an outside surface of the vertical plane and into one of the wheels in the pair of wheels and acts as an axle for rotation of the wheel and wherein a longitudinal end of the thrust assembly which opposes the axle extending end, comprises a rotation hole which can contain a rotation pin that passes through the rotation hole and through a rear longitudinal member which is in a plane parallel to the vertical plane of the thrust assembly.

2. The single axle tow dolly of claim 1, wherein the frame is rectangular, with the width of the dolly being longer than the length of the dolly.

3. The single axle tow dolly of claim 1, wherein the frame contains a front platform area which is a rectangular shape with a front of the dolly defining a length of the rectangular shape, and with a length of the front platform area along sides of the dolly being defined by a width of the rectangular shape.

4. The single axle tow dolly of claim 3, wherein the front platform area of the frame also contains one or more motorcycle wheel holding brackets along a front centered portion of a platform of the front platform area.

5. The single axle tow dolly of claim 3, wherein the front platform area also contains a gate emanating perpendicularly and vertically from a front width perimeter portion of the front platform area.

6. The single axle tow dolly of claim 3, wherein the frame further contains a rear wheel area directly behind the front platform area, which contains longitudinal members which continue to define sides of the dolly frame, and which run parallel in terms of their length substantially to the diameter of the wheels.

7. The single axle tow dolly of claim 6, wherein the rear wheel area further comprises two wheel lock sections.

8. The single axle tow dolly of claim 7, wherein the rear wheel area further comprises a rear width closing beam which is coupled width wise across the frame to each of the wheel lock sections on either opposing side of the frame to serve as a support.

9. The single axle tow dolly of claim 7, wherein an additional platform material is inset into the rear section of the frame.

10. The single axle tow dolly of claim 1, wherein the frame of the tow dolly contains a tow connector portion which is coupled to a front width of the frame through a trapezoid framed area.

11. The single axle tow dolly of claim 10, wherein the tow connector portion is capable of being angled at different angles when the tow dolly is lowered and raised.

12. The single axle tow dolly of claim 1, wherein the set of hydraulic cylinders comprises two hydraulic cylinders and wherein each of the two hydraulic cylinders is coupled to a separate wheel of the pair of wheels.

13. The single axle tow dolly of claim 1, wherein the tow dolly is configured such that the tow dolly can be lowered to a ground level flush position from an elevated position by rotating the thrust assembly clockwise and forward on the rotation pin in the plane of the vertical plane, and towards a front of the tow dolly by a contraction of a piston of the hydraulic cylinder.

14. The single axle tow dolly of claim 13, wherein the tow dolly is configured such that the tow dolly can be elevated from the ground level flush position back to the elevated position by rotating the thrust assembly counter clockwise and backwards on the rotation pin in the plane of the vertical plane, and towards a rear of the tow dolly by an extension of a piston of the hydraulic cylinder.

15. A single axle tow dolly comprising:
a frame;
a pair of wheels coupled to the frame;
a set of hydraulic cylinders coupled to the pair of wheels, wherein the dolly is configured such that the entire frame can be lowered to and raised from a ground position with the hydraulic cylinders; and,
a detachable wheel lock section, and wherein the hydraulic cylinders can be connected to a rear wheel area of the frame by a thrust assembly mechanism, and wherein the thrust assembly mechanism comprises a vertical plane, and a horizontal plane which is perpendicular in orientation to the vertical plane, and is centered along a surface of the vertical plane and wherein the thrust assembly further comprises an axle extending from one longitudinal end of an outside surface of the vertical plane and into one of the wheels in the pair of wheels and acts as an axle for rotation of the wheel and wherein a longitudinal end of the thrust assembly which opposes the axle extending end, comprises a rotation hole which can contain a rotation pin that passes through the rotation hole and through a rear longitudinal member which is in a plane parallel to the vertical plane of the thrust assembly.

16. A method of loading a dolly comprising:
providing a single axle tow dolly which comprises:
a frame;
a pair of wheels coupled to said frame; and,
a set of hydraulic cylinders coupled to said pair of wheels, wherein the dolly is configured such that the frame can be lowered to and raised from a ground position with the hydraulic cylinders, and wherein the hydraulic cylinders can be connected to a rear wheel area of the frame by a thrust assembly mechanism, and wherein the thrust assembly mechanism comprises a vertical plane, and a horizontal plane which is perpendicular in orientation to the vertical plane, and is centered along a surface of the vertical plane and wherein the thrust assembly further comprises an axle extending from one longitudinal end of an outside surface of the vertical plane and into one of the wheels in the pair of wheels and acts as an axle for rotation of the wheel and wherein a longitudinal end of the thrust assembly which opposes the axle extending end, comprises a rotation hole which can contain a rotation pin that passes through the rotation hole and through a rear longitudinal member which is in a plane parallel to the vertical plane of the thrust assembly;
lowering the single axle tow dolly to a ground position;
loading a vehicle or cargo onto the single axle tow dolly; and,
raising the single axle tow dolly from the ground position to an elevated position.

* * * * *